Figure 3:
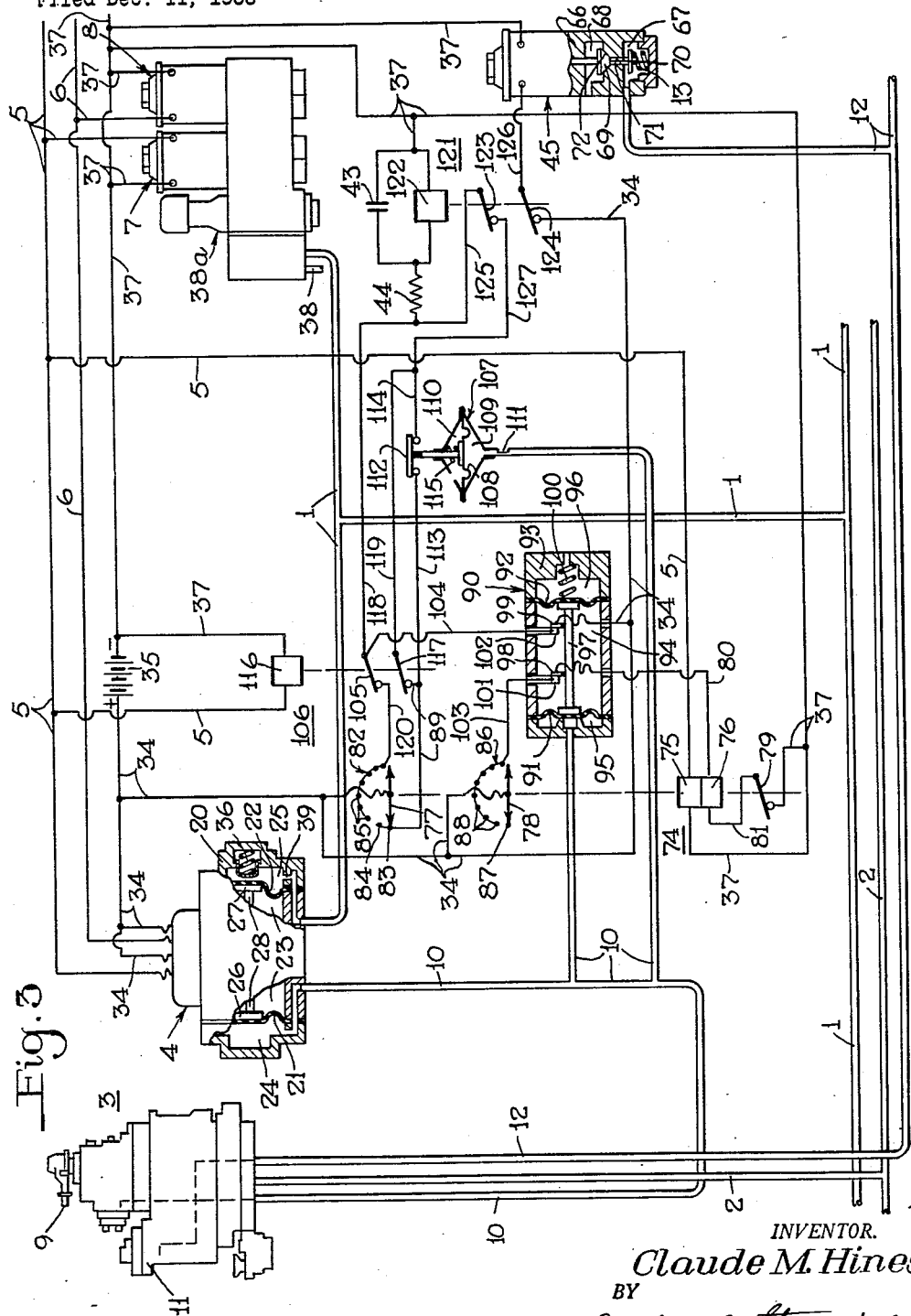

April 16, 1957    C. M. HINES    2,789,017
ELECTRO-PNEUMATIC BRAKE APPARATUS
Filed Dec. 11, 1953    2 Sheets-Sheet 1
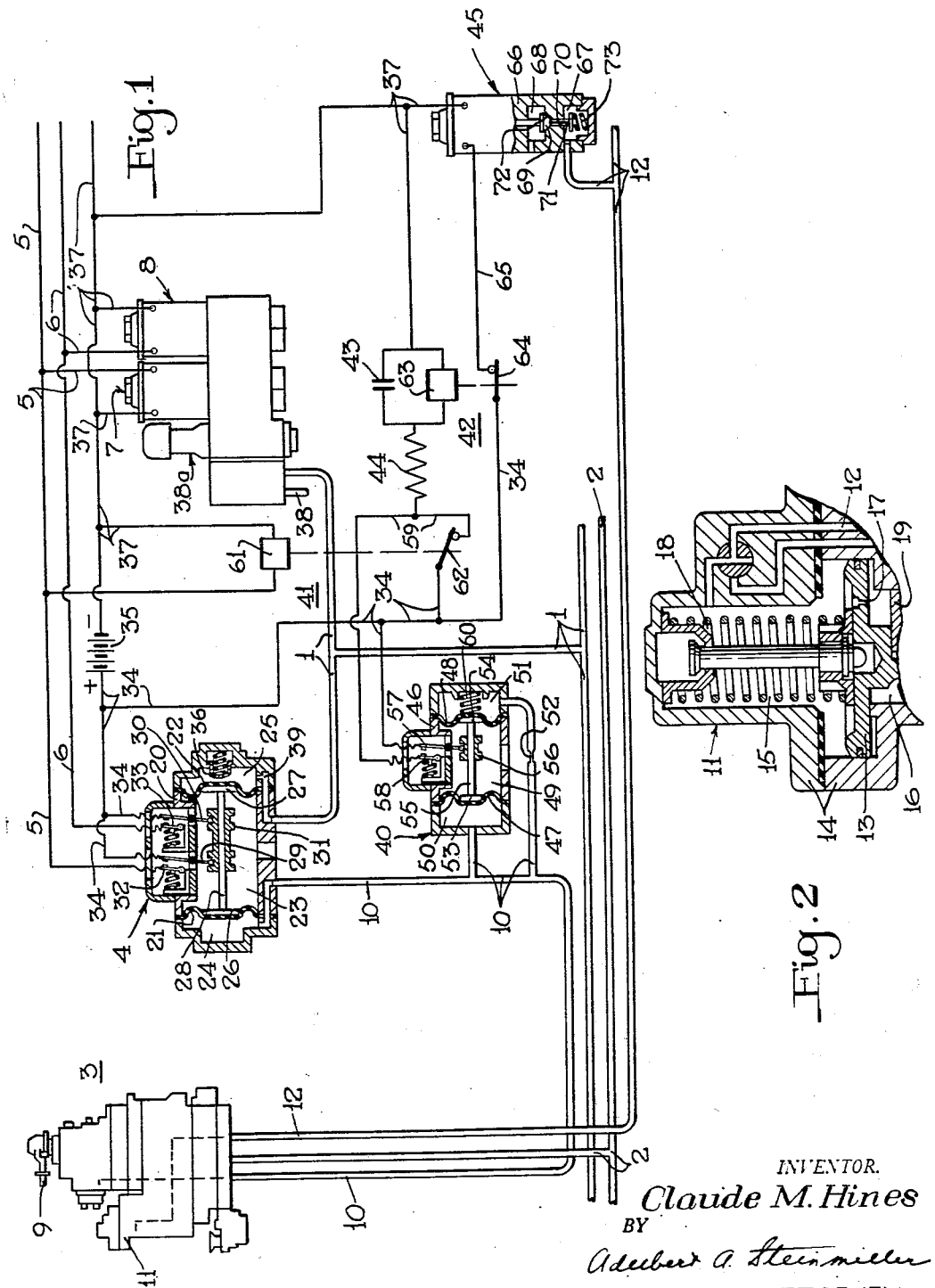
INVENTOR.
Claude M. Hines
BY
Adelbert A. Steinmiller
ATTORNEY April 16, 1957 C. M. HINES 2,789,017
ELECTRO-PNEUMATIC BRAKE APPARATUS
Filed Dec. 11, 1953 2 Sheets-Sheet 2

INVENTOR.
*Claude M. Hines*
BY
*Aubert A. Steinmiller*
ATTORNEY

United States Patent Office 2,789,017
Patented Apr. 16, 1957

2,789,017

ELECTRO-PNEUMATIC BRAKE APPARATUS

Claude M. Hines, Verona, Pa., assignor to Westinghouse Air Brake Company, Wilmerding, Pa., a corporation of Pennsylvania Application December 11, 1953, Serial No. 397,578

9 Claims. (Cl. 303—26)

This invention relates to electro-pneumatic brake apparatus and more particularly to such apparatus of the type adapted for use on railway trains and the like.

In the Westinghouse Air Brake Company's Instruction Leaflet No. 2606-1 dated February 1950, there is shown and described a No. 24–RL locomotive brake equipment adapted to control the fluid pressure brakes on an electric or diesel-electric locomotive and on the cars connected thereto on either the automatic principle through the medium of a brake pipe or the electro-pneumatic principle through the medium of so-called application and release train wires and a straight-air pipe.

This locomotive brake equipment comprises a manually operable engineer's brake valve device for varying, selectively, the pressure of fluid in the brake pipe and in a straight-air control pipe, the pressure in the latter pipe and in the straight-air pipe controlling operation of an electro-pneumatic master controller, which, in turn, controls energization and deenergization of the application and release train wires, which extend through the locomotive and cars of the train, for actuating application and release magnet valve devices provided on the locomotive and also provided, as a part of the car brake equipment, on the connected cars.

A serious leakage condition in the straight-air pipe or a break in the application or release train wire or in a return wire (to be described subsequently) may so vitiate an electro-pneumatic brake application as to render train operation hazardous. If only a partial brake application is effective due to one or more of the above causes, the engineer may not realize this condition in time to avoid a collision by actuating the brake valve device to an emergency position (hereinafter to be described) for thereby effecting an emergency application of the brakes throughout the train; or the emergency application, if timely made, may be so violent as to cause severe injury to passengers, for on trains in passenger service the brakes are generally controlled on the electro-pneumatic principle.

The principal object of this invention is therefore to provide an improved electro-pneumatic brake apparatus embodying novel means for insuring a brake application in spite of the existence of potentially serious conditions such as those above described.

According to this object, novel means are provided for causing a reduction in pressure of fluid in the brake pipe and thereby effecting an application of the automatic fluid pressure brakes on the locomotive and connected cars of a train in the event of a serious leakage condition in the straight-air pipe or failures in the electrical portion of an electro-pneumatic brake apparatus.

An additional object is to provide a novel brake insuring means of the type indicated in the foregoing object and especially adapted for use with the No. 24–RL brake equipment or brake apparatus of similar type.

Other objects and advantages will become more apparent from the following more detailed description of the invention.

In the accompanying drawings: Fig. 1 is a diagrammatic view, partly in section and partly in outline, of a first embodiment of the invention shown illustratively with a portion of the No. 24–RL brake equipment; Fig. 2 is an enlarged sectional view of the service portion of an engineer's brake valve device shown in outline in Fig. 1; and Fig. 3 is a diagrammatic view of a second embodiment of the invention shown illustratively with the No. 24–RL brake equipment included in Fig. 1.

DESCRIPTION

Since both embodiments of the invention are adapted for use with electro-pneumatic brake apparatus of the type shown and described in the aforementioned instruction leaflet, the disclosure in the following description and in the accompanying drawings has been limited to only such structure as is essential to a clear understanding of the respective embodiments of the invention.

First embodiment—Figs. 1 and 2

Referring to Fig. 1 of the drawings, the improved electro-pneumatic brake apparatus comprises the usual straight-air pipe 1 and brake pipe 2, both of which are adapted to extend through the locomotive and cars of a train. This apparatus further comprises the usual engineer's automatic brake valve device 3, electro-pneumatic master controller 4, application train wire 5 and release train wire 6 (both adapted to extend through the locomotive and cars of the train), application magnet valve device 7, release magnet valve device 8, and a novel brake insuring portion constituting a first embodiment of the invention and comprising generally, the remaining components shown in said figure, which components will hereinafter be described. All of the structure referred to above is provided exclusively on the locomotive, except as already otherwise stated.

The brake valve device 3 may, for sake of illustration, be of the type designated in the aforementioned instruction leaflet as the "DSE–24 Brake Valve." This brake valve device comprises, briefly, a manually adjustable shifter lever (not shown) to adapt said device for operation, selectively, on the automatic or electro-pneumatic straight-air principles, and also comprises valve means (not shown) operable by movement of a handle 9 for controlling, selectively, the pressure of fluid in the brake pipe 2 and in a straight-air control pipe 10.

When the brake valve device 3 is adjusted for operation on the automatic principle, the handle 9 is movable to a release position for charging the brake pipe 2 with fluid under pressure for thereby releasing the automatic fluid pressure brakes throughout the train; to a running position for charging said brake pipe at a reduced rate and maintaining said brakes released; to a service position for effecting any desired degree of service reduction in the pressure of fluid in said brake pipe; to a lap position for bottling-up the fluid in said brake pipe at the desired reduced pressure; and to an emergency position for venting said brake pipe to atmosphere and thereby effecting an emergency application of the automatic brakes.

When the brake valve device 3 is adjusted for operation on the electro-pneumatic principle, the handle 9 is movable to a running position for venting the straight-air control pipe 10 to atmosphere and thereby causing a release of the electro-pneumatic brakes on the locomotive and connected cars. The handle 9 is movable from running position into an application and release zone for charging the pipe 10 with fluid at a pressure proportional to the extent of such movement and thereby effecting a corresponding degree of brake application, and is also movable to an emergency position for causing the brake pipe 2 to be vented to atmosphere for thereby effecting an emergency application of the automatic fluid pressure brakes, as during operation on the automatic principle; said brake pipe, during operation on the electro-pneumatic principle, normally being charged with fluid under pressure in all positions of handle 9 except emergency position for preventing an undesired application of the automatic fluid pressure brakes.

The brake valve device 3 comprises the usual service application portion 11, which is operative automatically upon venting of fluid under pressure from a safety control conduit 12 to cause a safety control brake application by causing a so-called service application of the automatic fluid pressure brakes on the locomotive and connected cars, as will now be explained.

As shown in Fig. 2 of the drawings, the service application portion 11 comprises, briefly, a piston 13 slidably mounted in a sectionalized casing 14 and subject on one side to pressure of fluid in a control chamber 15 and on the opposite side to pressure of fluid in a chamber 16. The chamber 16 is adapted to be constantly charged with fluid under pressure from the usual main reservoir (not shown) and the chamber 15 is adapted to be vented to atmosphere by way of the safety control conduit 12 or to be charged with fluid under pressure from chamber 16 by way of a bleed port 17 provided in piston 13 for permitting equalization, at a controlled rate, of the pressures of fluid in said chambers. A helical spring 18 disposed in the control chamber 15 urges the piston 13 to a normal position for thereby defining a normal position of a slide valve 19 disposed in chamber 16 and carried by said piston. The piston 13 and hence slide valve 19 are adapted, upon venting of fluid under pressure from the control chamber 15, to assume an opposite limit or application position by action of the pressure of fluid in chamber 16 overcoming resistance of spring 18. With the slide valve 19 in application position, the safety control conduit 12 will also be vented by way of a lock-over port (not shown), in accordance with the usual practice, and a service reduction in the pressure of fluid in brake pipe 2 (Fig. 1) will be effected and result in the aforementioned safety control brake application.

As shown in Fig. 1 of the drawings, the electro-pneumatic master controller 4 (which may be identical with the device of similar name described in the aforementioned instruction leaflet) comprises a sectionalized hollow casing 20 between opposite end portions of which are clamped, in spaced coaxial relation, two flexible diaphragms 21, 22 separated by a non-pressure chamber 23 constantly open to atmosphere; the respective diaphragms being subject on their non-adjacent sides to pressures of fluid in pressure chambers 24, 25 defined by the respective end portions. The chambers 24, 25 are chargeable with fluid under pressure or ventable to atmosphere by way of the straight-air control pipe 10 and a branch of the straight-air pipe 1, respectively. The diaphragms 21, 22 are provided with coaxially arranged followers 26, 27 disposed within the non-pressure chamber 23 and connected to each other, for movement in unison, through the medium of a coaxially aligned rod 28; the longitudinal position of said rod being controlled by the comparative pressures of fluid in the chambers 24, 25.

Two movable contact members 29, 30 disposed in the chamber 23 are operably connected to the rod 28 through the medium of an insulated shifter spool 31 rigidly mounted on said rod; said contact members being known as the application contact member and release contact member, respectively. The contact members 29, 30 are each rockable at a point intermediate their respective ends and adapted at their opposite ends for engagement with spring supported application and release contact members 32, 33, respectively, which are yieldable so as to permit continued movement of the rod 28 in a rightward direction, as viewed in Fig. 1 of the drawings, against resistance of the corresponding spring supports after such engagement has been first established. The movable contact members 29, 30 are connected to a supply wire 34 which, in turn, is connected to the positive terminal of a source of electrical energy, such as a battery 35; and the yieldable contact members 32, 33 are connected, respectively, to the application and release train wires 5, 6.

The master controller 4 has a release position, in which it is shown in Fig. 1 of the drawings and in which position the rod 28 is so situated that the application contact members 29, 32 are disengaged from each other and release contact members 30, 33 are also disengaged from each other. Upon movement of the rod 28 to the right from its shown position, the release contact member 30 is adapted to engage the yieldable release contact member 33 for thereby energizing the release train wire 6; and thereafter, upon continued movement of said rod to the right, the application contact member 29 is adapted to engage the yieldable application contact member 32 for thereby energizing the application train wire 5. A spring supported stop member 36, disposed in chamber 25, is provided for stabilizing operation of the master controller 4 between a lap position (in which rod 28 first engages said stop member and the wires 6, 5 are energized and deenergized, respectively) and an application position (in which said rod compresses said stop member and the wires 6, 5 are concurrently energized).

The application and release magnet valve devices 7, 8 (which may be of the combined type designated in the aforementioned leaflet as the "No. 21-B Magnet and Bracket") comprise respective supply and release valve means (not shown), operation of each of which is controlled by energization and deenergization of the winding of a respective electro-magnet (not shown). The application and release magnet valve devices 7, 8 have one terminal connected in parallel with the application and release train wires 5, 6, respectively, and the other terminal of each of said devices is connected to a battery return wire 37 extending through the train and connected to the negative terminal of the battery 35. When the release train wire 6 is deenergized, the aforementioned release valve means is adapted to vent the straight-air pipe 1 to atmosphere by way of a vent port (not shown); and when said wire is energized, said release valve means is adapted to close communication between said pipe and vent port. When the application train wire 5 is energized, the aforementioned supply valve means is adapted to establish communication between the straight-air pipe 1 and a fluid pressure supply pipe 38 connected to an auxiliary reservoir (not shown) provided on the locomotive; and when said wire is deenergized, said supply valve means is operative to disestablish such communication. It will thus be noted that when the master controller 4 is in lap position, in which the wires 5, 6 are respectively deenergized and energized, the application and release magnet valve devices 7, 8 cooperate to bottle up the fluid in the straight-air pipe 1.

The above-described locomotive brake equipment is adapted for use with car brake equipment, which may be of the type shown and described in Instruction Pamphlet No. 5064, Sup. 27 of the Westinghouse Air Brake Company, dated November 1945. This car brake equipment comprises, briefly, application and release magnet valve devices (not shown), identical in structure with the respective devices 7, 8 and connected, in the manner just described, in parallel with the application and release train wires 5, 6, respectively, and also the battery return wire 37; which wires 5, 6 and 37 extend through the train, as previously stated. An auxiliary reservoir (not shown) is provided on each car for locally supplying fluid under pressure to the straight-air pipe 1 upon energization of the application magnet valve device on such car; and the release magnet valve device on each car is adapted, when energized, to locally vent said straight-air pipe to atmosphere.

The locomotive and car brake equipment thus far described is operative in exactly the same manner as that shown in the aforementioned instruction leaflet and pamphlet, respectively. Thus, when the handle 9 of brake valve device 3 is moved from running position into the application and release zone, fluid under pressure will be supplied to the straight-air control pipe 10 and will flow to the chamber 24 of master controller 4, causing deflection of diaphragm 21 and consequent movement of rod 28 toward chamber 25. As the rod 28 is thus moved, it will successively cause the respective release and application wires 6, 5 to be energized for thereby causing the release and application magnet valve devices 8, 7 on the locomotive, as well as those on the cars, to successively terminate local venting of the straight-air pipe 1 and then locally charge the latter pipe with fluid under pressure from the corresponding auxiliary reservoirs.

During this charging of the straight-air pipe 1, fluid under pressure will flow at a controlled rate through a choke 39 into chamber 25 of master controller 4; said choke being provided for stabilizing movement of the rod 28 toward chamber 24. When the pressure of fluid in chamber 25 has attained substantial equalization with that in chamber 24, the rod 28 will be urged toward chamber 24 by the spring-supported stop member 36, causing the master controller 4 to assume its lap position.

When, however, the handle 9 of brake valve device 3 is thereafter moved toward release position, the pressure of fluid in the straight-air control pipe 10 will be reduced below that in the straight-air pipe 1, and hence the preponderant pressure of fluid in chamber 25 will cause the master controller 4 to assume its release position, in which the application and release train wires 5, 6 are concurrently deenergized. Under this condition, the release magnet valve devices on the locomotive and cars will each operate to locally vent the straight-air pipe 1 until the pressure of fluid in said pipe is once again substantially equal to that in the control pipe 10, whereupon the master controller 4 will reassume its lap position, as will be understood from previous description.

If the application train wire 5 were to become broken at any point rearward of the place where the application magnet valve device 7 on the locomotive is connected thereto, the aforementioned application magnet valve devices on the cars rearward of the point of such break would never be energized, and consequently a brake application on such cars would be delayed until the portion of the straight-air pipe extending through these cars is charged by operation of the application magnet valve devices on the cars forward of such break.

If, on the other hand, the release train wire 6 were to become broken at a point such as above described, the brake application on the cars rearward of such point would be defective because the aforementioned release magnet valve devices on such cars, being deenergized, would locally vent the straight-air pipe 1 to atmosphere, while the corresponding application magnet valve devices are locally charging said pipe with fluid under pressure, thereby causing leakage of fluid under pressure from the corresponding auxiliary reservoirs to atmosphere.

If the battery return wire 37 were to become broken, no potential could be developed in the cars rearward of the point of such break and hence the application and release magnet valve devices on such cars would be completely inoperative, thereby preventing local charging of the straight-air pipe 1 and causing said pipe to be locally vented to atmosphere, resulting in discharge to atmosphere of fluid under pressure supplied from the non-affected cars.

Thus, a break in the application, release or battery return wire or a break in the straight-air pipe will not only result in an uneven degree of braking throughout the train and produce a slack run-in condition, but such failure may so vitiate the electro-pneumatic brake application as to render train operation hazardous.

According to the invention, two embodiments of the novel brake insuring portion are provided for installation on the locomotive for effecting a brake application in spite of the existence of conditions such as those just described.

Referring to Fig. 1 of the drawings, the first embodiment comprises an electro-pneumatic time-delay switch 40; a relay 41; a slow pick-up and release relay means, which for sake of illustration may comprise a relay 42, a condenser 43, and a resistor 44; and an application or magnet valve device 45; the slow pick-up and release relay means being optional, but preferable for reasons to be explained subsequently.

The electro-pneumatic switch 40 may, for sake of illustration, comprise a sectionalized, hollow casing 46, between respective end portions of which are clamped, in spaced coaxial relation, two flexible diaphragms 47, 48 separated by a non-pressure chamber 49 constantly open to atmosphere; the respective diaphragms being subject on their non-adjacent sides to pressure of fluid in pressure chambers 50, 51, respectively. The chambers 50, 51 are adapted to be charged with fluid under pressure or vented to atmosphere by way of different branches of the straight-air control pipe 10; a choke 52 being provided in the branch leading to chamber 51, however, so as to retard the rate of build-up of fluid under pressure in the latter chamber as compared to the former chamber, for reasons to be explained presently.

The diaphragms 47, 48 are provided with coaxially arranged followers 53, 54 disposed in chamber 49 and attached at their adjacent sides to a coaxially aligned rod 55. Rigidly mounted on the rod 55 is an insulated shifter spool 56 which is operatively connected to one end of a movable contact member 57, which is rockable at a point intermediate its ends and adapted to be carried by said rod into and out of engagement with a yieldable, spring-supported contact member 58. The contact member 57 is connected to a branch of the supply wire 34, and contact member 58 is connected to a control wire 59.

A helical spring 60 disposed in chamber 51 normally urges the diaphragm 48 and hence rod 55 into a position in which they are shown in Fig. 1 of the drawings, and in which position the contact members 57, 58 are disengaged from each other, for thereby defining an open position of the switch 40. Upon supply of fluid under pressure to the straight-air control pipe 10 during the initial phase of an electro-pneumatic brake application, the pressure of fluid in chamber 50 acting on diaphragm 47 is adapted to cause movement of the rod 55 toward chamber 51 for thereby causing the switch 40 to assume a closed position, in which the contact members 57, 58 engage each other for thereby energizing the control wire 59. The switch 40 is adapted to remain in closed position until the pressure of fluid in chamber 51 attains substantial equalization with that in chamber 50, whereupon said switch will reassume its open position under action of spring 60 on rod 55. The switch 40 will thus be in an open position except for a relatively short period of time immediately following an increase in the pressure of fluid in the straight-air control pipe 10; the length of said period being dependent upon the extent of such increase in pressure and also the size of choke 52 in relation to the inner diameter of pipe 10. According to design, the choke 52 is of such size as will cause the switch 40 to remain in closed position during an electro-pneumatic brake application build-up for a tolerable period of time during which the application train wire 5 may remain energized for effecting such application under normal leakage conditions, as will be understood from subsequent description of operation.

The respective terminals of the relay 41 are connected to branches of the application train wire 5 and battery return wire 37. The relay 41 comprises a winding 61 for controlling operation of an armature which actuates a back contact member 62 that is connected to a branch of the battery supply wire 34 and adapted to make contact with control wire 59. The term "back contact member" denotes a contact member which is normally in a closed position and is adapted to be actuated by the armature to an open position when an energizing voltage is developed across the corresponding relay, while the term "front contact member" (to be hereinafter used) denotes a contact member which is normally in open position and is adapted to be actuated to a closed position when an energizing voltage is developed across the corresponding relay.

One terminal of relay 42 is connected to the control wire 59 through the resistor 44, the other terminal being connected to a branch of the battery return wire 37.

The relay 42 comprises a winding 63 for controlling operation of an armature which actuates a front contact member 64 connected to the battery supply wire 34 and adapted to make contact with a wire 65.

The condenser 43 is shunt connected across the terminals of relay 42 and adapted to be charged at a controlled rate during energization of control wire 559 so that it may discharge and thereby maintain an energizing voltage across said relay for a limited period of time if the control wire 59 should subsequently become deenergized, for reasons to be explained subsequently.

The resistor 44 is provided for limiting the rate at which the condenser 43 will be charged during energization of control wire 59, so that short, frequent operation of the master controller 4 between lap and application positions indicative of an abnormal leakage condition in the straight-air pipe will prevent said condenser from being charged so rapidly that the faulty condition will not be recognized. Stated differently, the resistor 44 and condenser 43 provide a means for measuring the relative percentages of time that the application wire 5 and hence control wire 59 are energized and deenergized, for thereby recognizing undesired shuttling operation of the master controller 4 resultant from a leakage condition as noted in the straight-air pipe 1, as will be demonstrated subsequently.

It is to be noted that the switch 40 detects a fault during the initial build-up of the electro-pneumatic brake application, while the resistor 44, condenser 43 and relay 42 are arranged to detect, primarily, a fault after an initial build-up has been obtained.

The magnet valve device 45 may, for sake of illustration, be of the type shown in Fig. 1 of the drawings; the respective terminals of said relay being connected to the wire 65 and battery return wire 37. The device 45 comprises a sectionalized casing 66 having a pressure chamber 67 connected to a branch of the safety control conduit 12 and also having an exhaust chamber 68 constantly open to atmosphere. An exhaust valve 69, for controlling communication between chambers 67, 68, is disposed in the latter chamber and has a fluted stem 70 slidably guided in a bore 71 extending through a casing partition separating chambers 67, 68. The device 45 further comprises an electro-magnet (not shown) adapted to be energized by way of wire 65 for preventing communication between chambers 67, 68 by causing the exhaust valve 69 to engage a seat 72 formed in the aforementioned casing partition in encirclement of bore 71. A helical spring 73, disposed in chamber 67 and acting on a collar fixed on stem 70, is adapted to unseat the valve 69 when the aforementioned electromagnet is deenergized, for thereby causing the safety control conduit 12 to be vented to atmosphere by way of chambers 67, 68.

If desired, the resistor 44, relay 42, condenser 43 and wire 65 may be eliminated and the control wire 59 connected directly to the one terminal of device 45 to which the wire 65 is shown connected. Under such condition, if the control wire 59 should become deenergized at any time, the magnet valve device 45 will be deenergized and cause venting of the safety control conduit 12, thereby initiating a safety control brake application. Thus, since any leakage condition in the straight-air pipe 1 will cause the master controller 4 to move to application position to recharge said pipe, the consequent deenergization of control wire 59, even momentarily, will cause a safety control brake application to be initiated. In view of the fact that a certain amount of straight-air pipe leakage is considered normal and permissible, however, the preferred arrangement includes the relay 42, condenser 43 and resistor 44, for thereby assuring that a safety control brake application will not be effected unless warranted by a sufficiently serious leakage condition in the straight-air pipe or by an unduly delayed or a defective electro-pneumatic brake application, as will be demonstrated subsequently.

*Operation—Figs. 1 and 2*

In operation, assume initially that the brake valve device 3 is adjusted for operation on the electro-pneumatic straight-air principle; that the handle 9 of said device is in running position, in which the brakes are released throughout the train; and that the safety control conduit 12 and brake pipe 2 are charged with fluid under pressure.

Under these conditions, the respective components of the improved electro-pneumatic brake apparatus will be in the positions in which they are shown in Figs. 1 and 2 of the drawings.

With handle 9 in running position, the straight-air control pipe 10 will be vented to atmosphere; in consequence thereof, the electro-pneumatic switch 40 will be in open position, and the master controller 4 will be in release position in which the application and release train wires 5, 6 are deenergized. With wires 5, 6 deenergized, the application and release magnet valve devices on the locomotive and connected cars will cooperate to close off the aforementioned auxiliary reservoirs from the straight-air pipe 1 and to open said pipe locally to atmosphere on the locomotive and each car, in the manner previously explained.

With the application train wire 5 and hence relay 41 deenergized, back contact member 62 of said relay will be in closed position, thereby maintaining the control wire 59 energized, which, in turn, will have caused a charge to be built up on the condenser 43 (and hence across the relay 42 shunt connected thereto) for thereby maintaining an energizing voltage across said relay and consequently maintaining the magnet valve device 45 energized by way of the wire 65. Under such condition, the exhaust valve 69 of device 45 will be seated, thereby closing off pressure chamber 67 from exhaust chamber 68 and hence bottling up fluid under pressure in the safety control conduit 12.

Assume now that the handle 9 of brake valve device 3 is moved from running position into the application and release zone, for thereby supplying fluid under pressure to the straight-air control pipe 10 for effecting an electro-pneumatic brake application. Pressure of the fluid thus supplied to pipe 10 will simultaneously actuate the master controller 4 and the electro-pneumatic switch 40.

The master controller 4 will move from release position through lap position to application position, successively energizing the release train wire 6 and then the application train wire 5 for thereby causing the release and application magnet valve devices 8, 7 on the locomotive as well as those on the connected cars to successively terminate local venting of the straight-air pipe 1 to atmosphere and then locally charge the latter pipe with fluid under pressure from the corresponding auxiliary reservoirs.

During this operation of the master controller 4, the switch 40 will be moved from open position to closed position by pressure of fluid in chamber 50, thereby maintaining the control wire 59 continuously energized, despite the movement of back contact member 62 to an open position resultant from energization of the application train wire 5 and consequently of the relay 41. Since the control wire 59 and hence relay 42 are thus maintained continuously energized, the control wire 65 and hence the magnet valve device 45 will remain energized for preventing a safety control brake application.

If the application and release train wires 5, 6 are intact and leakage from the straight-air pipe 1 is within allowable limits, the application and release magnet valve devices on the locomotive and cars will operate within an allowable period of time to charge the straight-air pipe 1 to a pressure substantially equal to that in the straight-air control pipe 10; whereupon the master controller 4 will move from application position to lap position (in which the application train wire 5 is deenergized while the release train wire 6 remains energized) for thereby bottling up fluid at the desired pressure in the straight-air pipe 1. As soon as the application train wire 5 is deenergized the relay 41 will operate to energize the control wire 59; and despite the subsequent movement of the switch 40 to open position upon attainment of substantial equalization of pressures of fluid in the respective chambers 50, 51, the control wire 59 will be continuously energized for thereby maintaining the magnet valve device 45 energized and preventing a safety control brake application.

With the electro-pneumatic brake application thus made and with straight-air pipe leakage within allowable limits as above assumed, the master controller 4 will move at infrequent intervals from lap to application position to make up such leakage. Under such condition, the controller 4 will be in application position for a relatively small percentage of time and hence the voltage loss across the relay 42 during discharge of condenser 43 (while the said controller is in application position) will be made up when said controller returns to lap position and thereby causes back contact member 62 of relay 41 to reenergize the control wire 59 for recharging said condenser.

It will now be seen that if the fault is one which unduly delays the initial buildup of an electro-pneumatic brake application in the locomotive, i. e., causes the master controller 4 to remain in application position for a protracted period of time before moving to lap position, the application wire 5 will still be energized when the switch 40 moves to open position and consequently deenergizes the control wire 59. The condenser 43 will thereupon discharge to maintain an actuating voltage across the relay 42 for a certain period of time, but if the application wire 5 is not energized within such period for terminating such discharge and recharging said condenser, the relay 42 will drop out, causing front contact member 64 to move to open position and hence causing the magnet valve device 45 to be deenergized and initiate a safety control brake application, as will be understood from previous description.

On the other hand, if the fault is one which permits the master controller 4 to move to lap position at some time while an actuating voltage is still being developed across the relay 42, but thereafter causes said controller to shuttle between lap and application positions and thereby cause the control wire 59 to be deenergized for such a relatively great percentage of the time that the condenser 43 discharges to a point where it fails to maintain an actuating voltage across the relay 42, a safety control brake application will likewise be initiated by deenergization of the magnet valve device 45. The manner in which deenergization of device 45 causes the safety control brake application will be explained subsequently.

The effects of the various types of faults will now be examined. If the application wire 5 becomes broken at a point near the locomotive, thereby preventing energization of all application magnet valve devices rearward of such point during an electro-pneumatic brake application, the application magnet valve devices which are energized will operate to not only locally charge their respective sections of the straight-air pipe 1 but also to charge the sections of said pipe rearward of the point of the break. Under such condition, a safety control brake application will be effected, generally due to the delayed initial build-up. If the break is nearer the rear of the train, however, an initial build-up will generally be obtained and, if the condition is sufficiently serious, a safety control brake application will result from the above described progressive discharge of the condenser 43.

If the release train wire 6 becomes broken at any point rearward of the release magnet valve device 8, all such devices rearward of the point of the break will remain deenergized and hence locally vent the corresponding sections of the straight-air pipe 1, while the energized application magnet valve devices throughout the train will operate to locally build up pressure against such leakage, resulting in venting of fluid under pressure from the corresponding auxiliary reservoirs to atmosphere by way of the vented sections of said pipe. In accordance with the usual practice, a cut-off valve device 38a associated with the application and release magnet valve devices 7, 8 on the locomotive and similar cut-off valve devices (not shown) on the connected cars prevent depletion of the corresponding auxiliary reservoir pressure below approximately 75 p. s. i., but this does not assist in any way in providing an electro-pneumatic brake application on the affected cars. If a sufficient number of cars are thus affected, a safety control brake application will generally be effected by shuttling operation of the master controller 4 causing progressive discharge of the condenser 43.

A leakage condition resultant from a break in the straight-air pipe itself will, if sufficiently serious, cause a safety control brake application to be effected by virtue of the shuttling operation of the master controller 4 unless the point of the break is in the locomotive or the adjacent car which prevents or delays the initial build-up of the electro-pneumatic brake application on the locomotive.

A broken battery return wire 37 will cause both the application and release magnet valve devices on all cars rearward of such break to be completely inoperative because no potential will be developed for actuating said devices. Under this condition the sections of the straight-air pipe in the affected cars will not only be locally vented but they will not be locally supplied with fluid under pressure; and since fluid under pressure supplied from the non-affected cars will thus be vented to atmosphere by way of the respective deenergized release valve devices, there will consequently be substantially no brake application on the affected cars. Under this hazardous condition, the initial build-up will be delayed, and possibly never attained, if the break occurs relatively near the locomotive, whereas, if the break is relatively near the rear end of the train, the condenser 43 may be progressively discharged by shuttling operation of the controller 4, causing in either event a safety control brake application.

As previously stated, deenergization of the magnet valve device initiates a safety control brake application. With device 45 deenergized, fluid under pressure in the control chamber 15 (Fig. 2) of service portion 11 of brake valve device 3 will be vented to atmosphere by way of the safety control conduit 12 and chamber 67, bore 71, unseated exhaust valve 69 and exhaust chamber 68 of device 45. During this venting of control chamber 15, pressure of fluid in chamber 16 of device 3 will cause piston 13 and slide valve 19 to move to application position, thereby also venting the safety control conduit 12 by way of the aforementioned lock-over port and effecting a safety control brake application by causing a service reduction in the pressure of fluid in the brake pipe 2; said lock-over port being provided, in accordance with the usual practice, for assuring that the engineer may not interrupt and thereby prevent a safety control brake application once same has been initiated.

Assume now that a safety control brake application has occurred as a result of any of the above-described causes and that the engineer now wishes to recapture control of the train.

The engineer moves the handle 9 of brake valve device 3 to running position, thereby venting the straight-air control pipe 10 to atmosphere and hence causing the master controller 4 to move to release position, in which the application and release train wires 5, 6 are concurrently deenergized. As soon as the wire 5 is thus deenergized, the relay 41 will operate to energize the control wire 59, thereby causing the condenser 43 to charge, at a rate controlled by resistor 44, and thereby build up the voltage across the relay 42 until said relay operates to energize the magnet valve device 45 by way of the wire 65. This, in turn, will cause the device 45 to operate to seat the exhaust valve 69 for thereby terminating the venting of the safety control conduit 12 by way of said device; said conduit will still be vented, however, by way of the aforementioned lock-over port.

Next, the engineer manually adjusts the aforementioned shifter lever for adjusting the brake valve device 3 for operation on the automatic principle; such adjustment being possible, in accordance with the usual practice, only while the handle 9 is in running position. After this adjustment, the handle 9 is moved from running position to lap position, for thereby closing the lock-over port and consequently enabling fluid under pressure in chamber 16 to recharge the safety control conduit 12 by way of the bleed port 17 in piston 13 and the control chamber 15 of the service portion 11 of the brake valve device 13. When the pressure of fluid in chamber 15, and hence in conduit 12, attains substantial equalization with that in the chamber 16, the service portion 11 will operate in the manner previously described to carry the slide valve 19 to normal position.

With slide valve 19 in normal position, the engineer may now move the handle 9 to running position and the train will be in condition to proceed in the normal manner. It should be noted, however, that the brakes on the locomotive and train will thenceforth be controlled on the automatic principle.

Assume now that a safety control brake application has occurred as a result of venting of the safety control conduit 12 by operation of one of the usual safety control devices (not shown), such as the so-called "dead man" safety control valve, and without any fault of the electro-pneumatic brake apparatus.

The engineer moves the handle 9 of brake valve device 3 to running position for re-energizing the magnet valve device 45, in the manner just described, and then moves said handle into the application and release zone to a point at which, in accordance with the usual practice, the lock-over port will be closed. After the slide valve 19 (Fig. 2) has returned to normal position, in the manner just described, the engineer may return the handle 9 to running position and the train will be in condition to proceed in the normal manner, with braking still controlled on the electro-pneumatic principle.

It will thus be noted that the novel brake insuring portion may be used in conjunction with any of the other well-known safety devices which are operative under various conditions to vent the safety control conduit 12 for likewise initiating a safety control brake application.

*Description—second embodiment—Fig. 3*

Referring to this figure, all components which are identical in structure, operation and function with those already described in connection with Fig. 1 are designated with the same reference numerals as in the latter figure, and subsequent description will be limited to structure thus far not described constituting the second embodiment of the invention.

This embodiment comprises a stepping relay 74 having two operate windings 75, 76 for controlling, respectively, normal rotation and homing of two double-edged contact arms 77, 78 which are insulated from each other but are mechanically connected so that rotation of one will cause rotation of the other; said relay also controlling operation of a back contact member 79. The terminals of winding 75 are connected, respectively, to branches of the application train wire 5 and the battery return wire 37; and the terminals of winding 76 are connected, respectively, to a wire 80 and a wire 81, the latter wire being connected to the back contact member 79. The arm 77 is adapted to sweep about an arcuately arranged series of terminals constituting a bank 82. This bank comprises a home terminal 83 and an adjacent terminal 84 which are connected to each other electrically; the remaining terminals being designated generally by the reference numeral 85 since they are connected to each other electrically, though separated from terminals 83, 84. The arm 78 is similarly adapted to sweep about an arcuately arranged series of terminals constituting a bank 86; said bank comprising a home terminal 87 which is separated from the remaining terminals designated generally by the reference numeral 88.

Upon energization of either winding 75 or 76 of relay 74, the contact arms 77, 78 are adapted to move in unison in a clockwise direction to the adjacent terminal, and back contact member 79 is adapted to break contact with return wire 37; whereas upon deenergization of either winding, each arm is adapted to remain in contact with the corresponding adjacent terminal, and contact member 79 is adapted to make contact with wire 37. Thus, during each successive energization and deenergization cycle of relay 74, the arms 77, 78 will move in unison in a clockwise direction from one terminal to an adjacent terminal.

When the straight-air control pipe 10 is devoid of fluid under pressure and windings 75, 76 are concurrently deenergized, the contact arms 77, 78, which are connected to branches of battery supply wire 34, are each adapted to assume a home position, in which they contact, respectively, the corresponding home terminals 83 and 87. With arm 77 in home position, voltage will be supplied by way of said arm to a wire 89, for reasons to be brought out in subsequent description of operation.

An electro-pneumatic switch 90 is provided for actuating the contact arms 77, 78 to their respective home positions and also supplying necessary voltage for maintaining the magnet valve device 45 energized when the electro-pneumatic brakes are released, as will be understood from subsequent description.

The switch 90 may comprise, for sake of illustration, two flexible diaphragms 91, 92 clamped in spaced-apart, coaxial relation between respective end portions of a sectionalized, hollow cylindrical casing 93, for thereby defining between said diaphragms a non-pressure chamber 94 and on the opposite (i. e., non-adjacent) sides of said diaphragms, respectively, a pressure chamber 95 and an atmospheric chamber 96; said pressure chamber being chargeable with fluid under pressure by way of a branch of the straight-air control pipe 10. The diaphragms 91, 92 are connected together, for deflective movement in unison, through the medium of a rod 97 extending through chamber 94 and attached to corresponding followers of said diaphragms. Rigidly mounted on rod 97 are contact elements 98, 99 connected, respectively, to the wire 80 and to a branch of the battery supply wire 34.

In operation, when the straight-air control pipe 10 and hence chamber 95 are vented, a helical spring 100 disposed in atmospheric chamber 96 and acting on diaphragm 92 urges the rod 97 to one limit position in which the contact elements 98, 99 engage non-yieldable contact elements 101, 102, respectively, for thereby defining a closed position of switch 90. When, however, fluid under pressure is supplied to pipe 10 and hence to chamber 95, the pressure of such fluid acting on diaphragm 91 causes movement of rod 97 to an opposite limit position against resistance of spring 100, causing contact elements 98, 99 to be disengaged from the corresponding contact elements 101, 102, for thereby defining an open position of switch 90. The contact element 101 is connected by way of a wire 103 to the contacts 88 of bank 86, and the element 102 is connected by way of a wire 104 to a back contact member 105 of a relay 106, which will be described presently.

An electro-pneumatic switch 107 is provided for detecting an unduly delayed initial build-up of an electro-pneumatic brake application, indicative of such as a broken application train wire 5 or battery return wire 37, as will be explained in subsequent description of operation.

The switch 107 may comprise, for sake of illustration, a flexible diaphragm 108 clamped between portions of a sectionalized, hollow casing and separating a pressure chamber 109 from a non-pressure chamber 110. The chamber 109 is chargeable with fluid under pressure or ventable to atmosphere by way of a branch of the straight-air control pipe 10, which branch contains a choke 111 for delaying the rate of build-up of pressure in said chamber so that a contact bar 112 operably connected to the diaphragm 108 will maintain an electrical connection between a wire 113 and a wire 114 for a limited time interval after charging of pipe 10 and then break such connection when the pressure in chamber 109 has increased sufficiently to overcome resistance of a helical spring 115 which is disposed in chamber 110 for so biasing the diaphragm 108 as to favor such connection by contact bar 112; said wire 113 being connected to the wire 89.

The relay 106 is provided for operatively maintaining the magnet valve device 45 energized when the application wire 5 is deenergized. The relay 106 comprises a winding 116 for controlling operation of the back contact member 105 and of a back contact member 117, which contact members are connected, respectively, to a wire 118 and a wire 119; the terminals of said relay being connected, respectively, to branches of the application train wire 5 and battery return wire 37.

When relay 106 is deenergized, the back contact members 117, 105 are adapted to make contact, respectively, with a branch of the wire 89 and with a wire 120 connected to the terminals 85 of bank 82; and when said relay is energized, said back contact members are adapted to break such contact.

In order to maintain the magnet valve device 45 energized and thereby prevent a safety control brake application, an energizing voltage must be continuously maintained across the terminals of a relay 121, which is basically similar in function though not in structure with the relay 42 of the first embodiment (Fig. 1). The relay 121 comprises a winding 122 for controlling operation of front contact members 123, 124; one terminal of said relay being connected through resistor 44 to the wire 118 and the other terminal being connected to a branch of the battery return wire 37. The condenser 43 is shunt connected across the terminals of relay 121, and said condenser and the resistor 44 serve the same purpose as in the first embodiment (Fig. 1). The front contact member 123 is connected by way of a wire 125 to the wire 118. The front contact member 124 is connected to the positive terminal of magnet valve device 45 by way of a wire 126; the other terminal of said device being connected to the battery return wire 37.

As long as an energizing voltage is maintained across relay 121, the contact member 124 makes contact with a branch of battery supply wire 34 for maintaining device 45 energized, and the contact member 123 makes contact with a wire 127 which is connected to wires 114 and 119. When, however, the voltage across relay 121 is insufficient to energize it, the contact members 123, 124 will operate to break the contacts just described, and the device 45 will consequently be deenergized and initiate a safety control brake application, as will be understood from description in connection with the first embodiment (Fig. 1).

*Operation—Fig. 3*

In operation, assume initially that the brake valve device 3 is adjusted for operation on the electro-pneumatic straight-air principle and the handle 9 of said device is in running position; that the safety control conduit is charged with fluid under pressure; that contact arms 77, 78 engage home terminals 83, 87, respectively, of the corresponding banks 82, 86; and that there is no fault in the electro-pneumatic brake apparatus.

Under this assumed condition, the various components will be in the respective positions in which they are shown in Fig. 3 of the drawings.

Accordingly, with handle 9 in running position, the straight-air control pipe 10 will be devoid of fluid under pressure, in consequence of which the master controller 4 will be in release position, in which both the application and release train wires 5, 6 are deenergized. The application and release magnet valve devices 7, 8 on the locomotive, as well as those on the connected cars, will therefore cooperate to locally cut off the straight-air pipe 1 from the corresponding auxiliary reservoirs and to, at the same time, locally vent the latter pipe to atmosphere, as will be understood from description in connection with Fig. 1.

With the straight-air control pipe 10 vented, the switches 90, 107 will be in their respective closed positions. Hence voltage will be supplied from battery supply wire 34 to relay 121 and condenser 43 by way of the contact elements 99 and 102 of switch 90, wires 104, 118 and resistor 44, for thereby charging said condenser and also maintaining an actuating voltage across said relay for causing its front contact member 124 to deliver voltage from battery supply wire 34 to magnet valve device 45.

It will also be noted that the relay 121 will be energized by way of two other circuits which are of secondary importance inasmuch as they depend initially upon the existence of an actuating voltage across said relay so that the front contact member 123 will engage the wire 127 by way of which secondary energization is accomplished. Thus, under the assumed condition, voltage will be supplied to wire 127 by way of contact arm 77, home terminal 83 of bank 82, wire 89 and thence via not only the back contact member 117 and wire 119 but also via wire 113, contact bar 112 (switch 107 being in closed position, as above noted) and wire 114. It should be noted also that both windings 75, 76 of the stepping relay 74 will be deenergized; the former winding because the application train wire 5 is deenergized and the latter winding because the contact arm 78 being in home position, is unable to deliver voltage to the wire 103 and hence to wire 80.

Assume now that the engineer moves the handle 9 of brake valve device 3 from running position into the application and release zone for charging the straight-air control pipe 10 with fluid at a pressure corresponding to the degree of electro-pneumatic brake application desired.

Pressure of fluid in pipe 10 will cause the switch 90 to move to open position and also cause the master controller 4 to move to application position for energizing both the application and release train wires 5, 6 for thereby actuating the various application and release magnet valves in the previously described manner. Energization of application train wire 5 will energize winding 75 of relay 74, thus causing the contact arms 77, 78 to move in unison to the adjacent terminals 84, 88, respectively; also the back contact member 79 of said relay will break contact with the return wire 37 (which is of no consequence). Energization of wire 5 will also cause contact members 105, 117 of relay 106 to break their respective contacts with wires 120, 89.

Since switch 90 is in open position, voltage will not be supplied to condenser 43 and relay 121 by way of wire 104, but voltage will be supplied to said condenser and relay by way of contact arm 77, terminal 84 of bank 82, wires 89, 113, contact bar 112, wires 114, 127, front contact member 123 of said relay, wire 125 and resistor 44. It is to be noted that contact bar 112 will engage the wires 113, 114 for only a certain interval of time, for fluid under pressure supplied to pipe 10 and flowing therefrom through choke 111 will eventually cause deflection of diaphragm 108 against resistance of spring 115, thereby effecting disengagement of said contact bar; said choke being of such size as to delay such disengagement of the contact bar until, under normal tolerable conditions corresponding to a maximum degree of brake application, the application wire 5 will be deenergized by movement of the master controller 4 to lap position as a result of the attainment of substantial equalization in pressures of fluid in the straight-air control pipe 10 and straight-air pipe 1.

If the application wire 5 is deenergized in the above manner at or prior to the time the contact bar 112 disconnects the wires 113, 114 from each other, a continuous voltage supply to condenser 43 and relay 121 will be maintained by way of contact arm 77, terminal 84, wire 89, back contact 117 of relay 106, wire 119, wire 127, front contact member 123 of relay 121, wire 125 and resistor 44.

If, on the other hand, the initial build-up of the brake application is unduly delayed, as by virtue of a break in the application train wire 5 or battery return wire 37, the voltage supply to condenser 43 and relay 121 will be cut off, because, as long as wire 5 is energized, the back contact member 117 of relay 106 will be disconnected from the energized wire 89. Hence condenser 43 will discharge until it is no longer capable of maintaining an actuating voltage across relay 121; whereupon the back contact member 124 of said relay will be disconnected from battery supply wire 34, and the magnet valve device 45 will consequently be deenergized and cause a safety control brake application to be effected in the manner described in connection with the first embodiment.

Assume now that the initial build-up in the electro-pneumatic brake application was timely effected (i. e., before the relay 121 became deenergized) but that a leakage condition, resultant from such as a break in the straight-air pipe 1 or a broken release train wire 6, causes the master controller 4 to move from lap to application position, thereby reenergizing application train wire 5. Such re-energization will cause the contact arms 77, 78 to move to the next adjacent terminals 85 and 88, respectively, as well as cause back contact members 105, 117 of relay 106 to be disconnected from wires 120, 89, respectively; as a consequence thereof, the voltage supply to condenser 43 and relay 121 will be cut off.

If the leakage is within tolerable limits, this reenergization of the application wire 5 will be for such a relatively short period of time that the condenser 43 will maintain an actuating voltage across relay 121 during such period, and upon subsequent deenergization of said wire, the loss in charge on such condenser will be substantially restored by way of contact arm 77, one of the terminals 85 of bank 82, wire 120, back contact member 105 of relay 106, wire 118 and resistor 44; it being noted that the resistor 44, as in the first embodiment, retards the charging rate of condenser 43 for thereby rendering the desired degree of sensitivity to the relative percentages of time the wire 5 is energized and deenergized during any subsequent periodic shuttling operation of the master controller 4 to make up leakage from the straight-air pipe 1.

It is to be noted that during each consecutive impulse cycle, defined by successive energization and deenergization of the application wire 5, the contact arms 77, 78 will be advanced from one of the terminals 85, 88 to next adjacent corresponding terminals 85, 88. It should also be noted that since all voltage supplied to the condenser 43 and relay 121 is by way of resistor 44, the sensitivity and proper operation of the novel brake insuring portion will be assured even if the contact arms 77, 78 should, during a brake application, sweep to their respective home positions, as a result of numerous successive impulse cycles.

Assume now that with the contact arms 77, 78 engaging any of the terminals 85, 88 of the corresponding banks 82, 86, the handle 9 of brake valve device 3 is moved from the application and release zone to running position for venting the straight-air control pipe 10 and thereby releasing the brake application.

Venting of the straight-air control pipe 10 will cause the master controller 4 to move to release position, in which train wires 5, 6 are deenergized, and will also cause the switch 90 to move toward closed position. Voltage supply to the condenser 43 and relay 121 will be maintained initially by way of back contact member 105 of relay 106 until the switch 90 is in closed position, whereupon voltage will also be supplied by way of wire 104, as will be understood from previous description. With switch 90 in closed position, the winding 76 of relay 74 will be energized by way of contact arm 78, one of the terminals 88 of bank 86, wire 103, contact elements 101, 98 and wire 80. As soon as winding 76 is energized, the contact arms 77, 78 will move to the next adjacent clockwise terminal and the back contact member 79 of said relay will break contact with the battery return wire 37, thus deenergizing said relay; whereupon back contact member 79 will again make such contact, and so on. It will thus be noted that the winding 76 will be successively energized and deenergized until the contact arms 77, 78 have attained their respective home positions, whereupon the contact arm 78 will be unable, via the separated or electrically isolated terminal 87, to energize the relay 76; the contact arms will consequently remain in such position and the stepping relay 76 will therefore remain deenergized. With the contact arms 77, 78 in home position, the condition initially assumed will exist, thereby assuring that voltage will be supplied by way of contact member 77 and terminal 84 of bank 82 upon the next energization of the application train wire 5 incident to an electro-pneumatic brake application build-up.

It will be noted that the novel structure constituting the second embodiment of the invention may be used in conjunction with any of the other usual types of safety control devices, and that recapture after any safety control brake application will be effected in the same manner as already described in connection with the first embodiment.

*Summary*

It will now be seen that an improved electro-pneumatic brake apparatus has been provided, both embodiments of which are operative to insure a safety control brake application when any one of a variety of failures in the electrical portion of said apparatus or a break in the straight-air pipe unduly delays the initial build-up of an electro-pneumatic brake application or vitiates the effectiveness of such application and thereby renders train operation hazardous; said improved apparatus being capable, however, of detecting and recognizing the seriousness of such failure or break so as not to cause frequent, undesired or unwarranted safety control brake applications where, for instance, leakage from the straight-air pipe is within normal allowable limits and/or the electro-pneumatic brakes are effective on a sufficient number of cars to assure safe operation of the train.

Having now described the invention, what I claim as new and desire to secure by Letters Patent, is:

1. In an electro-pneumatic brake apparatus of the type comprising pneumatically actuated means operative whenever the pressure of fluid in a straight-air control pipe exceeds that in a straight-air pipe to energize an application train wire for initiating an electro-pneumatic brake application, the combination of electro-responsive means normally in one position and movable to another position for initiating a safety control brake application, relay means having an energized position and a deenergized position for respectively causing movement of said electro-responsive means to said one position or said other position, a condenser connected in parallel with said relay means, a resistor in series with said relay means and condenser for restricting the rate of charging of said condenser, a control wire adapted to be energized for supplying electrical energy to said condenser and relay means by way of said resistor, first means for energizing said control wire when said application wire is deenergized, and second means adapted upon charging of said straight-air control pipe to maintain said control wire energized for an interval of time corresponding to a tolerable rate of build-up of an electro-pneumatic brake application, said condenser being operative upon deenergization of said control wire to maintain said relay means in said energized position for a period of time dependent upon the extent of charge built up while said control wire is energized, after which period said relay means is adapted to move to deenergized position unless said control wire is reenergized by intervening operation of said first means.

2. In an electro-pneumatic brake apparatus of the type comprising pneumatically actuated means responsive to preponderance of fluid pressure in a control conduit over opposing pressure of fluid in a straight air pipe for energizing an application train wire so as to effect a build up of an electro-pneumatic brake application, the combination of electro-responsive means normally in one position and movable to another position for initiating a safety control brake application, a control wire, relay means for energizing said control wire only during deenergization of said application wire, electro-pneumatic means responsive to an increase in pressure in the control conduit for energizing said control wire for a controlled time interval immediately following such increase in pressure in the control conduit, and slow pick-up and release relay means controlling operation of said electro-responsive means and normally operative to maintain said electro-responsive means in its said one position but responsive to either protracted or abnormally frequent deenergization of said control wire for causing movement of said electro-responsive means to said other position.

3. In an electro-pneumatic brake apparatus of the type comprising pneumatically actuated means responsive to preponderance of the pressure of fluid in a straight-air control pipe over that in a straight-air pipe to energize an application train wire for effecting an electro-pneumatic brake application, the combination of electro-responsive means normally in one position and movable to another position for initiating a safety control brake application, first relay means having an energized position and a deenergized position for respectively causing movement of said electro-responsive means to said one position or said other position, a condenser connected in parallel with said first relay means, a resistor in series with said first relay means and condenser for restricting the rate of charging of said condenser, a control wire adapted to be energized for supplying electrical energy to said condenser and first relay means by way of said resistor, second relay means for energizing said control wire when said application wire is deenergized, and electro-pneumatic means adapted upon an increase in pressure in said straight-air control pipe to maintain said control wire energized for an interval of time corresponding to a tolerable rate of build-up of an electro-pneumatic brake application, said condenser being operative upon deenergization of said control wire to maintain said first relay means in said energized position for a period of time dependent upon the extent of charge built up while said control wire is deenergized, after which period said first relay means is adapted to move to deenergized position unless said control wire is reenergized by intervening operation of said second relay means.

4. In an electro-pneumatic brake apparatus of the type comprising pneumatically actuated means operative whenever the pressure of fluid in a straight-air control pipe exceeds that in a straight-air pipe for energizing an application train wire for initiating an electro-pneumatic brake application, the combination of application valve means having one position and movable to another position for initiating an automatic brake application, a control wire slow pick-up and release relay means normally operative to cause operation of said application valve means to its said one position and operative in response to protracted or frequent deenergization of said control wire to cause operation of said application valve means to its said other position, first electro-pneumatic means for energizing said control wire when said straight-air control pipe is vented, means including second electro-pneumatic means for energizing said control wire for a certain time after initial charging of said straight-air control pipe, and relay means for energizing said control wire whenever said application wire is deenergized.

5. In an electro-pneumatic brake apparatus of the type comprising pneumatically actuated means operative whenever the pressure of fluid in a straight-air control pipe exceeds that in a straight-air pipe to energize an application train wire for initiating an electro-pneumatic brake application, the combination of electro-responsive means normally in one position and movable to another position for initiating a safety control brake application, relay means having an energized position and a deenergized position for respectively causing movement of said electro-responsive means to said one position or said other position, a condenser connected in parallel with said relay means, a resistor in series with said relay means and condenser for restricting the rate of charging of said condenser, a control wire adapted to be energized for supplying electrical energy to said condenser and relay means by way of said resistor, electro-pneumatic means movable to a closed position upon venting of said straight-air control pipe for energizing said control wire by way of a first circuit, stepping relay means for maintaining said control wire energized by way of a second circuit upon an increase in pressure of fluid in said straight-air control pipe, an electro-pneumatic time-delay switch for opening said second circuit after a certain interval of time during initial build-up of the electro-pneumatic brake application for recognizing prolonged delay in attainment of such build-up, second relay means cooperative with said stepping relay means for energizing said control wire by way of a third circuit whenever after attainment of such build-up said application wire is deenergized.

6. In an electro-pneumatic brake apparatus, in combination, a straight-air control pipe, an engineer's brake valve device operative to supply fluid under pressure to said control pipe, a straight-air train pipe, an increase in pressure in which is adapted to effect an application of train brakes, an application magnet valve device operative upon energization to supply fluid under pressure to said straight-air train pipe and upon deenergization to cut off supply of fluid under pressure to said straight-air train pipe, an application train wire connected to said appplication magnet valve device, a pneumatic relay device operative in response to pressure in said control pipe in excess of that in said straight-air train pipe to energize said train wire and upon substantial equalization of pressures in said control pipe and straight-air train pipe to deenergize said train wire, a normally charged pipe, venting of fluid under pressure from which is adapted to effect an application of train brakes, control means having a normal condition to hold fluid under pressure in said normally charged pipe and another condition to effect venting thereof, a control line, means responsive to deenergization of said train wire for supplying energy to said control line and to energization of said train wire for terminating such supply, automatic timing means responsive to initiation of an increase in pressure in said straight-air control pipe to supply energy to said control line for a chosen interval of time after said initiation and thereafter terminate such supply, means for storing energy supplied to said control line, and means controlling operation of said control means and operative to dissipate such stored energy in effecting normal conditioning of said control means and operative by dissipation of such energy beyond a certain extent to effect said other conditioning of said control means.

7. In an electro-pneumatic brake apparatus of the type comprising pneumatically actuated means responsive to preponderance of fluid pressure in a control conduit over an opposing fluid pressure for energizing an application wire extending through a plurality of connected vehicles so as to initiate a build-up of an electro-pneumatic brake application on said vehicles, the combination of a control circuit, application valve means responsive to deenergization of said control circuit for initiating an automatic brake application on said vehicles and responsive to energization of said control circuit for holding off the automatic brake application, relay means responsive to deenergization of the application wire for supplying energy to said control circuit and responsive to energization of the application wire for terminating such supply, and timing means responsive to an increase in pressure in the control conduit for supplying energy to said control circuit independently of said relay means for a short interval of time immediately following such increase in pressure for thereby preventing said application means from operating to initiate the automatic brake application during this interval and operative at the expiry of this interval to terminate such supply, such that energy will be continuously supplied to said control circuit only if the build-up of the electro-pneumatic brake application is completed during this interval.

8. In an electro-pneumatic brake apparatus, the combination of a straight air pipe, a control conduit, operator controlled valve means for controlling pressure of fluid in said control conduit, an application train wire, pneumatically actuated means responsive to preponderance of fluid pressure in said control conduit over that in said straight air pipe for energizing said application wire, means responsive to energization of said application wire for supplying fluid under pressure to said straight air pipe for causing an electro-pneumatic brake application, control valve means having one position for initiating an automatic brake application and another position in which it is ineffective for causing an automatic brake application, slow pick-up and release relay means operative so long as voltage is within a predetermined range to cause said control valve means to be maintained in said other position and responsive to a reduction in voltage below said range to cause operation of said control valve means to said one position, and other relay means responsive to deenergization of said application wire for supplying voltage to said slow pick-up and release relay means and responsive to energization of said application wire for interrupting such supply.

9. In an electro-pneumatic brake apparatus, the combination of a straight air pipe, a control conduit, operator controlled valve means for controlling pressure of fluid in said control conduit, an application train wire, pneumatically actuated means responsive to preponderance of fluid pressure in said control conduit over that in said straight air pipe for energizing said application wire, means responsive to energization of said application wire for supplying fluid under pressure to said straight air pipe for causing an electro-pneumatic brake application, control valve means having one position for initiating an automatic brake application and another position in which it is ineffective for causing an automatic brake application, a first relay adapted when energized to operatively maintain said control valve means in said other position and adapted when deenergized to cause operation of said control valve means to said one position, a condenser connected in parallel with said first relay, a control wire connected in series with said first relay and condenser, and a second relay responsive to deenergization of said application wire for supplying energy to said control wire and responsive to energization of said application wire for terminating such supply.

References Cited in the file of this patent

UNITED STATES PATENTS

| | | |
|---|---|---|
| 2,527,920 | Elsworth | Oct. 31, 1950 |
| 2,573,442 | Hines | Oct. 30, 1951 |